March 28, 1950     C. U. GRAMELSPACHER     2,501,937
INFLATION DEVICE FOR SAFETY TUBES
Filed Oct. 8, 1945
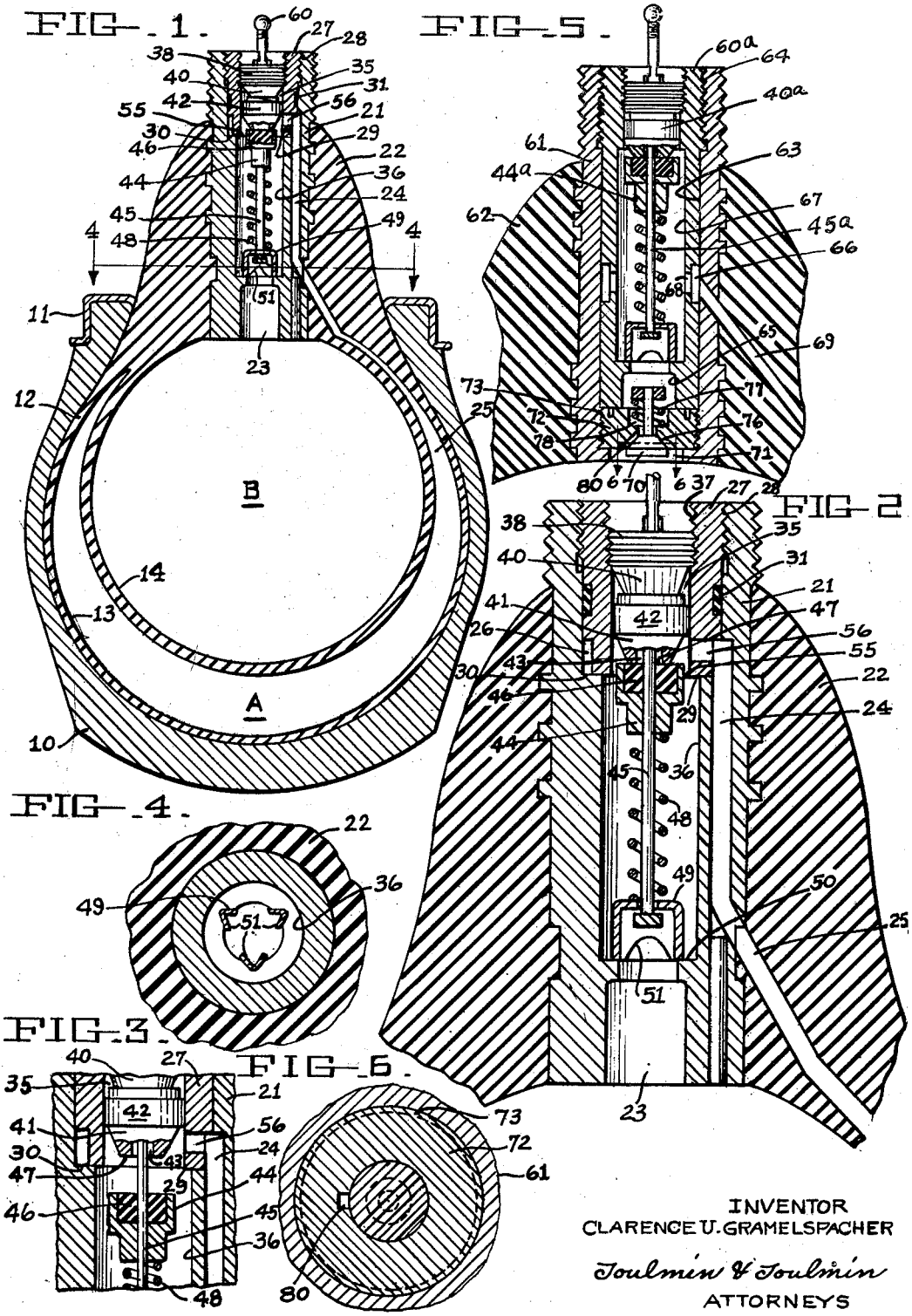
INVENTOR
CLARENCE U. GRAMELSPACHER
Toulmin & Toulmin
ATTORNEYS Patented Mar. 28, 1950

2,501,937

UNITED STATES PATENT OFFICE 2,501,937

INFLATION DEVICE FOR SAFETY TUBES

Clarence U. Gramelspacher, Jasper, Ind.

Application October 8, 1945, Serial No. 620,957

2 Claims. (Cl. 152—342)

This invention relates to improvements in duplex inner tubes and particularly to an improved valve stem and associated valve assembly for use with such tubes.

The use of duplex tubes in passenger car, truck and bus tires is a well recognized practice. These duplex tubes consist of an outer tube that is adapted to fit the inside wall of a tire casing, and an inner tube that is positioned within the outer tube and spaced therefrom so as to provide an inner and an outer air chamber within the tire. A small leak passage is provided in the inner tube so that in case of rupture of the outer tube, the inner tube will not deflate rapidly and thereby support the tire until the operator of the vehicle is able to stop.

One of the principal disadvantages of prior duplex tubes is that of inflation and deflation of the tubes. When the tubes are inflated, it is necessary to wait until the air pressure between the two chambers in the duplex tube has equalized through the small leak passage in the inner tube before the desired air pressure in the tube can be ascertained. This delays the period of filling such duplex tubes.

It is therefore an object of this invention to provide an improved valve stem and valve assembly therein that is constructed and arranged to permit a free flow of air into both chambers of a duplex tube simultaneously so that the filling action in both chambers is accomplished rapidly and the air pressure between the chambers is simultaneously equalized during the filling operation. Thus, it is an object of the invention to provide a valve arrangement for the duplex tube wherein filling of the duplex tube can be accomplished in identically the same manner as in a single tube and in the same time.

It is another object of the invention to provide a valve arrangement for controlling the air supplied to a duplex tube wherein the flow of air under pressure into the duplex tube for filling the same automatically operates a means that allows free flow of air into the inner chamber of a duplex tube simultaneously with the free flow of air into the outer chamber of a duplex tube, and which restricts the flow of air from the inner chamber to the outer chamber when the flow of air produced by the filling operation stops, whereby to prevent rapid deflation of the inner tube in case of rupture of the outer tube of a duplex tube.

It is another object of the invention to provide a valve assembly for a duplex tube in accordance with the foregoing objects wherein a conventional valve assembly can be placed within the valve stem of the device of this invention for accomplishing the purposes desired.

Another object of the invention is to provide a valve assembly for a duplex tube wherein a single valve member controls the flow of air into a duplex tube in such a manner as to allow a free flow of air into the inner and outer chambers of a duplex tube simultaneously for concurrent equalization of pressure therebetween during filling of the tube and for also restricing a free flow of air between the chambers of a duplex tube when the flow of filling air has ceased.

Still another object of the invention is to provide a valve assembly for a duplex tube in accordance with the foregoing object wherein any standard valve assembly can be inserted into the valve stem for accomplishing the purposes set forth.

Still another object of the invention is to provide a valve assembly for a duplex tube in accordance with any of the foregoing objects wherein the valve head of a standard type valve assembly is adapted to control the flow of air into a duplex tube in such a manner that when the valve head is off its seat to allow for entry of air into a duplex tube, a free flow of air is permitted into both chambers of a duplex tube, but when the valve head of the valve assembly is on its seat to prevent loss of air from the duplex tube, the valve head forms a restriction in a passage between the inner and outer chambers of the duplex tube to prevent free flow of air between the chambers in case of puncture or fracture of the outer tube of the duplex tube.

Further objects and advantages will become apparent from the drawings and the following description.

In the drawings:

Figure 1 is a cross-sectional view through a duplex tube and tire showing the improved valve assembly associated therewith.

Figure 2 is an enlarged vertical cross-sectional view taken through the valve assembly of this invention to illustrate the manner of its operation.

Figure 3 is a partial cross-sectional view of the valve assembly illustrated in Figure 2 showing the valve in open position.

Figure 4 is a horizontal cross-sectional view of the valve taken along line 4—4 of Figure 1.

Figure 5 is a vertical cross-sectional view of a modified form of valve assembly wherein there is used a standard valve member in association with a check valve.

Figure 6 is a horizontal cross-sectional view taken along line 6—6 of Figure 5 to illustrate the restriction opening through the check valves.

In the drawings, there is illustrated a tire 10 which may be of any conventional make, the tire 10 being carried upon a rim 11, as is standard practice. The inner tube 12, which in this invention is a duplex tube, consists of a tubular section 13 that is adapted to fit within the casing 10. An inner tubular section 14 is positioned within the outer section 13, and is spaced therefrom, to provide a space or air chamber A therebetween. The inner tubular section 14 thus forms an air chamber B that is separated from the air chamber A by the wall of the tubular section 14.

The wall construction of the tire casing 10, the tubular section 13 and the tubular section 14 are illustrated merely diagrammatically because these wall sections may be constructed in any desired manner. The wall section 13 may be constructed of rubber to permit its expansion against the inner wall of the casing 10, while the wall section 14 of the duplex tube 12 may be constructed of layers of rubberized fabric to form a small tire within the outer wall section 13, or the wall section 14 may also be constructed of rubber. The various constructions of the tire casing 10 and the walls of the duplex tube are well known in the art, and therefore further description of these elements is not believed necessary because they are not involved in this invention.

It has been conventional practice to provide a leak port in the wall 14 of the duplex tube to interconnect the chambers A and B of the duplex tube 12 to allow for equalization of air pressure therebetween, and a slow escape of air from the chamber B in case of puncture or fracture of the outer casing A. In this invention, however, the usual leak port provided in the wall 14 of the duplex tube 12 may be omitted, the leak port or resistance passage between the chambers A and B of the duplex tube 12 being, in this invention, carried through the valve assembly.

With particular reference to Figures 1 to 4, the valve stem, or valve body 21 is molded within an extension 22 provided on the duplex tube 12. This valve stem 21 has an opening or air passage 23 extending longitudinally through the same for delivery of air into the chamber B of the duplex tube 12. The side wall of the valve stem 21 contains one or more outlet passages 24 that communicate with one or more passages 25 in the side wall of the duplex tube 12 for delivery of air into the chamber A of the duplex tube, the combined areas of the passage or passages 24 being substantially equal to or at least not greater than the passage into the chamber B of the tube.

The passage 24 in the valve stem 21 communicates with an annular recess 26 provided in the lower end of an insert member 27 that is threaded within the upper end of the valve stem 21. The upper end of the insert 27 has the threads 28 that cooperate with corresponding threads in the valve stem 21 for attaching or holding the insert in position with the lower face 29 of the insert in engagement with a shoulder 30 extending radially from the passage 23. A resilient washer of rubber-like material 31 is provided in the insert 27 to seal against loss of air pressure along the walls between the insert 27 and the valve stem 21.

The insert 27 contains an axial opening 35 that is smaller in diameter than the axial opening 36 of the passage 23 forming a reduced diameter portion in the opening or passage 23. The upper end of the opening 35 is provided with threads 37 to receive the threaded end portion 38 of a standard valve assembly 40 to attach the same thereto. When referring to a standard valve assembly, such as the assembly 40, the applicant has reference to any of the conventional tire valves that have been sold on the market for many years as valve inserts for the valve stems of tubes of the single-wall variety that have been used on passenger cars for many years. Such a standard valve assembly consists of the threaded body portion 38, previously referred to, that is integrally associated with the body portion 41 that contains a resilient annular washer 42 of rubber-like material that frictionally engages the opening 35 in the insert 27 for the purpose of sealing against escape of air under pressure from the inside of the tube. The body portions 38 and 41 have an axial opening or inlet passage 43 therein through which air is supplied into the opening 23 of the valve stem 21.

The passage 43 of the standard valve 40 is closed by means of a valve head 44 secured to the valve actuating stem 45 in any suitable manner. The valve head is provided with a resilient seat 46 that seals against the valve seat 47 on the body portion 41 of the valve 40.

The valve stem 45 carrying the valve head 44 extends upwardly through the inlet opening 43 of the valve, and is adapted to be depressed to move the valve head 44 away from the valve seat 47 and thereby open the valve. A spring 48 is retained between the valve head 44 and a retaining member 49 carried on the end of the stem 45, which spring-urges the valve head 44 against the seat 47 to hold the same closed.

The opening 23 of the valve stem 21 contains a ledge 50 that is engaged by the member 49 of the valve 40 to thereby render the spring 48 active for holding the valve 44 upon its seat. The member 49 is generally triangular in shape, as illustrated in Figure 4, and is provided with openings 51 to allow for passage of air from the chamber 36 into the lower portion of the inlet passage 23.

In so far as the valve assembly 40 is concerned, this valve may be of any of the well-known valve members adapted to be used in any conventional tire tube, these valve members all having a movable head that opens the inlet air passage of the valve, such as the head 44.

The valve head 44 of the valve 40 has the upper end thereof positioned within the opening 35 of the insert 27, the opening 35 being of such a diameter relative to the diameter of the head 44 that the clearance between the valve head 44 and the wall of the opening 35 forms a resistance passage 55. The passage 24 in the valve stem 21 communicates with the opening 35 in the insert 27 through a radially drilled passage 56, this passage being positioned above the restriction passage 55.

From the foregoing description, it will be seen that the chamber A of a duplex tube is directly and continuously in communication with the inner chamber B of a duplex tube through the valve assembly by means of the passages 23, 36, 35, 56 and 24 to provide for equalization of pressure between these chambers at all times. Also, when the valve head 44 is in the closed position as illustrated in Figure 2, there is provided the resistance passage 55 in the reduced diameter portion of the passage communication system just referred to that restricts a free flow of air from the inner chamber B of the duplex tube to the outer chamber A thereof. Thus, should the outer tube A be punctured, the deflation of the inner chamber B of the duplex tube will be delayed by the resistance passage 55 causing a slow escape of air from the chamber B into the chamber A.

When the duplex tube 12 is to be inflated, or the pressure thereof corrected by the regular inflation, the valve stem 45 of the standard valve 40 is moved downwardly when the coupling of an air house is applied to the upper end 60 of the valve stem 45 in conventional manner to thereby open the inlet passage 43 in the body of the valve 40. When the valve stem 45 is moved downward by this operation, the head 44 on the valve stem 45 moves below the lower surface 29 of the insert 27 as illustrated in Figure 3, thereby eliminating the resistance passage 55, see Figure 2, and opening the chamber 36 to a free flow of air from the inlet 43 in the body of the valve 40. Thus, with the head 44 of the valve 40 positioned away from the opening 35 in the insert 27 there is provided a free flow of air simultaneously into the inner chamber B and the outer chamber A of the duplex tube, which flow of air can be just as rapid as that allowed by the opening 43 in the valve 40. Therefore, the filling or inflation of the duplex tube 12 in this invention will be just as rapid as the filling of a single-walled tube of conventional design. However, as soon as the coupling of the inflation hose is removed from the end 60 of the valve stem 45, the valve head 44 will be replaced upon its seat 47 and thereby reestablish the resistance passage 55.

It is also well known that it is conventional practice to remove the valve assembly from the valve stem of a tube when a tire change is to be made to allow for full and complete deflation of the tube. When the valve assembly 40 is removed from the valve stem, in this invention, there will be permitted a free flow of air from both chambers A and B of the duplex tube, because there is no resistance passage in either of the escape passages at this time. Also, if a small quantity of air is to be allowed to escape from the tube, such as when the tube has been slightly over-filled during an inflation period of the same, movement of the valve stem 45 inwardly in conventional manner will permit a free escape of air from both chambers A and B of the duplex tube simultaneously since the valve head 44 will, under this condition, be in the position illustrated in Figure 3. Thus, by the valve assembly of this invention there is no change in the manner of inflating or deflating a duplex tire from that practiced when inflating or deflating a single-walled conventional tube, thus making the use of a duplex tube just as facile as a single-walled conventional tube. Also, by the valve arrangement of this invention it is not necessary to provide specially manufactured valve inside members, such as the valve assembly 40 that can only be used with duplex tubes, but any standard valve assembly that can be inserted in the valve stem of a single-walled conventional tube can be used in the valve assembly of this device, thus making the duplex tube as easily serviceable as a conventional single-walled tube.

In Figures 5 and 6 there is shown a slightly modified arrangement of an air control valve for a duplex tube of the type previously referred to, wherein the valve insert or valve assembly 40a is of the same general type referred to with regard to the description of the valve illustrated in Figure 2. The valve member or valve insert 40a is carried within an insert member 60a that is disposed within the valve stem 61, the valve stem being molded within the extension 62 of a duplex tube. The valve stem 61 has an axial opening 63 to receive the body portion of the insert 60 which is retained therein by the threaded portion 64 on the upper end thereof. The insert member 60a has an axial opening 65 through which air is discharged into the chamber B of a duplex tube 12. Also, the insert 60a is provided with an annular recess 66 in the side wall thereof that communicates with the chamber 67 in the insert 60a by means of a port 68 so that air under pressure may be discharged into the passage 69 that communicates with the chamber A of a duplex tube.

A check valve 70 is provided in the exhaust passage 71 of the valve stem 61 to regulate the flow of air therethrough to and from the chamber B of a duplex tube. This check valve 70 consists of a body 72 threaded into the lower end of the valve stem 61 and retained therein by means of suitable threads 73. The check valve body 72 is adapted to be inserted into the opening 63 of the valve stem 61 through the upper end thereof for assembly after the tube has been manufactured.

The check valve body contains a check valve which may be of the poppet type that is retained on a valve seat 76 by means of a spring 77. A suitable passage 78 connects between the passage 65 and the passage 71 of the valve assembly to allow for air to pass therebetween.

On one side of the valve seat 75 there is provided a resistance passage 80 to allow for a leakage of air from the chamber B of a duplex tube to the chamber A thereof for equalizing the pressure between these chambers.

The passage 69 connecting the valve assembly with the chamber A of the duplex tube communicates with the chamber 67 between the check valve 70 and the valve head 44a of the valve member 40a so that a free flow of air is provided to the chamber A at all times when the valve 44a is open.

When the duplex tube is to be inflated, using a device of the type disclosed in Figure 5, the valve stem 45a is moved downwardly by the coupling connection on the end of an air hose in conventional manner to open valve 44a to thereby allow air to flow through the inlet passage of the valve 40a and into the passage 69 from the chamber 67 of the valve assembly. The flow of air under pressure into the chamber 67 and the passage 65 acts against the check valve 70 to cause the same to open and thereby allow a free flow of air through the check valve 70 into the chamber B of a duplex tube. Thus, when the tube is inflated, air will be delivered simultaneously to the chambers A and B of a duplex tube in a free flow. However, as soon as the air flow stops during the inflation period and the air is equalized between the chambers A and B of the duplex tube, the check valve 70 will close and thereby render the resistance passage 80 effective to prevent a free flow of air from the chamber B into the chamber A of a duplex tube to thereby avoid rapid deflation of the chamber B.

When a duplex tube utilizing the valve assembly disclosed in Figure 5 is to be changed in a tire, the standard valve 40a can be removed in conventional manner, thus rapidly deflating the chamber A of the duplex tube. A small wire or other instrument may then be inserted through the valve stem to open the check valve 70 to rapidly deflate the inner tube of the duplex tube. The resistance passage 80 through the check valve will allow complete deflation of the chamber B in case all of the air may not have been discharged at the time the check valve 70 was opened.

While the device disclosed and described herein constitutes a preferred form of the invention, yet there are mechanical alterations that can be made upon the device without departing from the spirit of the invention, and all modifications that fall within the scope of the appended claims are intended to be included herein.

Having thus fully described my invention, what I claim as new and desire to secure by Letters Patent is:

1. A filling valve for a duplex tube which includes, a valve stem having an opening therethrough, said opening having a reduced diameter portion therein, a valve in said opening attached therein and having a passage therethrough and including a movable valve head in said reduced diameter portion for controlling opening and closing of the passage in said valve, said valve head being positioned in said reduced diameter portion when closing said valve passage and cooperating with said reduced diameter portion to provide a resistance passage therebetween and being positioned out of said reduced diameter portion when said valve passage is open to provide a free passage through said reduced diameter portion, and an outlet passage extending from said opening between said head and said attachment.

2. A filling valve for a duplex tube which includes in the combination, a valve stem having an opening therethrough communicating with one chamber of a duplex tube, said opening having a reduced diameter portion therein, a valve in said opening attached therein and having a passage therethrough and including a movable valve head in said reduced diameter portion for controlling opening and closing of the passage in said valve, said valve head being positioned in said reduced diameter portion when closing said valve passage and cooperating with said reduced diameter portion to provide a resistance passage therebetween and being positioned out of said reduced diameter portion when said valve passage is open to provide a free passage through said reduced diameter portion, and an outlet passage extending from said opening between said head and said attachment into communication with the other chamber of the duplex tube.

CLARENCE U. GRAMELSPACHER.

REFERENCES CITED

The following references are of record in the file of this patent:

UNITED STATES PATENTS

| Number | Name | Date |
|---|---|---|
| 2,116,090 | Williams | May 3, 1938 |
| 2,189,485 | Crowley | Feb. 6, 1940 |
| 2,241,847 | Eherhard | May 13, 1941 |
| 2,272,548 | Creamer | Feb. 10, 1942 |
| 2,301,096 | Truscott | Nov. 3, 1942 |